(12) United States Patent
Kim et al.

(10) Patent No.: US 8,275,280 B2
(45) Date of Patent: Sep. 25, 2012

(54) PRINT TERMINAL UNIT AND METHOD OF CONTROLLING PRINT

(75) Inventors: Young-gu Kim, Suwon-si (KR); Don-seon Lee, Yongin-si (KR); Chang-shin Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/687,232

(22) Filed: Jan. 14, 2010

(65) Prior Publication Data
US 2010/0183321 A1 Jul. 22, 2010

(30) Foreign Application Priority Data

Jan. 16, 2009 (KR) .................................. 2009-38220

(51) Int. Cl.
*G03G 15/00* (2006.01)
(52) U.S. Cl. ................. 399/75; 399/80; 399/81
(58) Field of Classification Search .................. 399/75, 399/79–81, 85, 87; 358/1.13, 1.14, 1.15, 358/1.16, 1.9
See application file for complete search history.

(56) References Cited

U.S. PATENT DOCUMENTS

| 7,697,158 B2 * | 4/2010 | Jansen et al. | 358/1.16 |
| 2006/0028681 A1 * | 2/2006 | Aagesen | 358/1.15 |

FOREIGN PATENT DOCUMENTS

| JP | 2007219576 | 8/2007 |
| JP | 2008077228 | 4/2008 |
| JP | 2008108229 | 5/2008 |
| KR | 19990018084 | 3/1999 |
| KR | 20060041520 | 5/2006 |

* cited by examiner

*Primary Examiner* — Hoan Tran
(74) *Attorney, Agent, or Firm* — Stanzione & Kim, LLP

(57) ABSTRACT

A print terminal unit includes a storage unit to store a lookup table on which information regarding an image forming apparatus corresponding to at least one type of a document is recorded, a user interface through which at least one type of at least one document to be printed is selected, and a controller to control an image forming apparatus that corresponds to the selected type of the document among the plurality of image forming apparatuses according to the lookup table to print the document. Accordingly, the user easily performs printing operation using an image forming apparatus separately depending on the type of the document.

20 Claims, 12 Drawing Sheets

Example of Document of Preservation Period of Over 5 years document for long-term preservation, report (for approval), open document, contract, etc.

Example of Document of Preservation Period of Under 5 years report(draft), daily report, absenteeism and tardiness record report, weekly report, etc.

PRINT TERMINAL UNIT AND METHOD OF CONTROLLING PRINT

CROSS-REFERENCE TO RELATED APPLICATIONS

This application claims priority under 35 U.S.C. §119 (a) from Korean Patent Application No. 10-2009-03822, filed on Jan. 16, 2009, in the Korean Intellectual Property Office, the disclosure of which is incorporated herein by reference in its entirety.

BACKGROUND

1. Field of the Invention

The present general inventive concept relates to a print terminal unit and a method of controlling print, and more particularly, to a print terminal unit which is capable of selecting an image forming apparatus according to a type of a document to be printed, and a method of controlling print.

2. Description of the Related Art

An image forming apparatus refers to an apparatus which prints printing data generated by a terminal device such as a computer on a recording medium. Such an image forming apparatus includes a photocopier, a printer, a facsimile machine, and a multi function peripheral (MFP) combining the functions of the aforementioned devices in a single device.

The image forming apparatus is divided into a dot image forming apparatus, an ink-jet image forming apparatus, and a laser image forming apparatus according to the printing principle. Since the ink-jet image forming apparatus prints a document at a lower cost per sheet compared to the laser image forming apparatus but has poor water resistance and light resistance, it is not suitable for a document requiring a long-term preservation period. On the other hand, the laser image forming apparatus is suitable for a document requiring a long-term preservation period but is not suitable for a document requiring a short-term preservation period since it prints a document at a higher cost per sheet compared to the ink-jet image forming apparatus.

Therefore, if a plurality of image forming apparatuses is connected, it is economical to use the mage forming apparatuses separately depending on their uses as the quality and cost of the output are different for each image forming apparatus. However, in the related art, any information regarding which image forming apparatus should be used to perform economical printing operation is not provided, and also, even if the user is aware of which image forming apparatus would be beneficial to economical printing operation, it is inconvenient to change a printer driver every time that a print job is performed.

SUMMARY

Example embodiments of the present general inventive concept provide a print terminal unit which is capable of selecting an image forming apparatus according to a type of a document to be printed and a method of controlling print.

Additional embodiments of the present general inventive concept will be set forth in part in the description which follows and, in part, will be obvious from the description, or may be learned by practice of the general inventive concept.

Example embodiments of the present general inventive concept may be achieved by a print terminal unit, which is connectable to a plurality of image forming apparatuses, including a storage unit to store a lookup table on which information regarding an image forming apparatus corresponding to at least one type of a document is recorded, a user interface through which at least one type of at least one document to be printed is selected, and a controller to control an image forming apparatus that corresponds to the selected type of the document among the plurality of image forming apparatuses according to the lookup table to print the document.

The user interface may generate a UI window including a first area to display the at least one type of the document and a second area to display an image forming apparatus corresponding to the type of the document.

The type of the document displayed on the first area and the image forming apparatus displayed on the second area may be changeable.

The type of the document may be classified by a document preservation period.

The user interface may generate a UI window including a third area to display a classified document preservation period and a fourth area to display an image forming apparatus corresponding to the document preservation period.

The user interface may display a type of a document corresponding to the classified document preservation period on a separate window.

The storage unit may further store a history for a print job executed for the document, and the controller may determine one of the plurality of image forming apparatuses according to at least one of the lookup table and the history.

Example embodiments of the present general inventive concept may be also achieved by a method for controlling print of a print terminal unit which is connectable to a plurality of image forming apparatuses, the method including receiving selection of at least one type of at least one document to be printed, determining an image forming apparatus that corresponds to the selected at least one type of the document among the plurality of image forming apparatuses, using information regarding an image forming apparatus corresponding to a type of a document, and printing the document through the determined image forming apparatus.

The receiving the selection of the type of the document may include generating a UI window including a first area to display the at least one type of the document and a second area to display an image forming apparatus corresponding to the type of the document.

The type of the document displayed on the first area and the image forming apparatus displayed on the second area may be changeable.

The type of the document may be classified by a document preservation period.

The receiving the selection of the type of the document may include generating a UI window including a third area to display a classified document preservation period and a fourth area to display an image forming apparatus corresponding to the document preservation period.

The receiving the selection of the type of the document may include displaying the type of the document corresponding to the classified document preservation period on a separate window.

The method may further include storing a history for a print job executed for the document, and the determining may include determining one of the plurality of image forming apparatuses according to at least one of the lookup table and the history.

The receiving the selection may be performed by a printer driver or an application.

Example embodiments of the present general inventive concept may be also achieved by a print terminal unit which is connectable to one or more image forming apparatuses, the print terminal unit including a storage unit to store information regarding one or more image forming apparatuses, and a controller to determine one of the one or more image forming apparatuses according to the information and a characteristic of a document to be printed.

The controller may receive the information from the image forming apparatus, and the information represents the characteristic of the document.

The controller may obtain a history as the information according to a previous document which has been printed in the image forming apparatus.

The controller may obtain the information according to a user selection.

The print terminal unit may further include a unit to communicate with an external device to install a print driver, and the controller may obtain the information from the external device.

The controller may generate a signal representing an image to be displayed to show at least one of the information and the characteristic of the document.

The controller may determine the image forming apparatus to print the document when the information corresponds to the characteristic of the document.

The controller may determine another image forming apparatus to print the document when the image forming apparatus having the information is not connected.

The controller may determine another image forming apparatus to print the document when there is no match between the information of the image forming apparatus and the characteristic of the document.

The one or more image forming apparatuses may include a first image forming apparatus using a first printing material to form an image on a printing medium and a second image forming apparatus using a second printing material to form an image on a printing medium, and the controller may determine one of the first image forming apparatus and the second image forming apparatus as the image forming apparatus according to the characteristic of a document and the information on the first printing material and the second printing material Example embodiments of the present general inventive concept may be also achieved by an image forming apparatus including a memory unit to store information representing a characteristic of a document to be printed therein, and a controller to transmit the information to an external print terminal unit, and to receive the document having the characteristic from the external print terminal unit in response to the transmitted information.

Example embodiments of the present general inventive concept may be also achieved by a printing system including a print terminal unit connectable to a plurality of image forming apparatuses, the print terminal unit including a storage unit to store information regarding each of the image forming apparatuses, and a controller to control the image forming apparatus according to the information and a characteristic of a document to be printed, and the image forming apparatus may receive data of the document from the print terminal unit, and to print an image on a printing medium according to the received data.

The image forming apparatus may include a memory unit to store information representing the characteristic of the document to be printed therein, and a controller to transmit the information to the print terminal unit, and to receive the document having the characteristic from the print terminal unit in response to the transmitted information.

Example embodiments of the present general inventive concept may be also achieved by a method of controlling a print terminal unit which is connectable to a plurality of image forming apparatuses, the print terminal unit including storing information regarding one or more image forming apparatuses, and determining one of the image forming apparatuses according to the information and a characteristic of a document to be printed.

Example embodiments of the present general inventive concept may be also achieved by a computer readable medium containing computer readable codes as a program to perform a method of controlling in a print terminal unit which is connectable to a plurality of image forming apparatuses, the method including storing information regarding one or more image forming apparatuses, and determining one of the image forming apparatuses according to the information and a characteristic of a document to be printed.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIGS. 2 to 7 are views illustrating various examples of a user interface window of the print terminal unit;

DETAILED DESCRIPTION OF THE EMBODIMENTS

Figure 1:
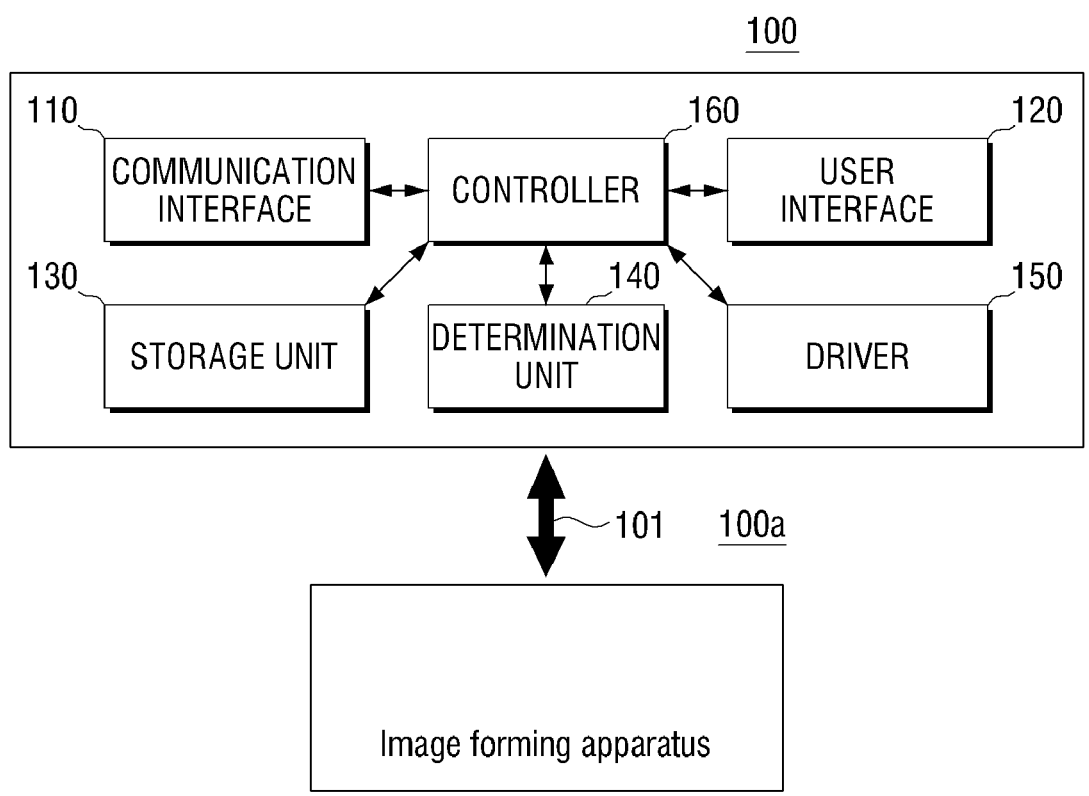
FIG. 1 is a block diagram illustrating a print terminal unit according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a printing system including a print terminal unit 100 according to an exemplary embodiment of the present general inventive concept. Referring to FIG. 1, the print terminal unit 100 includes a communication interface 110, a user interface 120, a storage unit 130, a determination unit 140, a driver 150, and a controller 160.

If the print terminal unit 100 is connected to one or more image forming apparatuses 100a, the communication interface 110 provides printing data of a format which can be processed by the image forming apparatus to print the printing data as an image on a printing medium. The printing data which can be processed by the image forming apparatus may include page description language (PDL) data written in a printer command language (PCL) or postscript (PS) language, image data and a XPS file. More specifically, the communication interface 110 is designed to connect the print terminal unit 100 to an external device, and gets access to the image forming apparatus via not only a local area network (LAN) or Internet but also a universal serial bus (USB) port.

The user interface 120 may have a key unit including a plurality of function keys through which a user can set or select various functions of the print terminal unit 100. The user interface 120 may have a display unit to display diverse information provided by the print terminal unit 100. The user interface 120 may be a device, a combination of the key unit and the display unit such as a touch pad, to simultaneously display an image (interface image) corresponding to the diverse information and/or the function keys and input at least one of the displayed function keys, or a device combining a mouse and a monitor. Accordingly, the user can select a document to print and input a command to print the selected document through the user interface 120. The user may select or input the information on a characteristic of the document as the document type through the user interface 120. Here, the document may represent an image corresponding to printing data which may be a text document, a picture image, a combination of the text document and the picture image, etc., to be printed as an image on a printing medium.

If the user interface 120 receives a command to print, the user interface 120 may receive selection of at least one type of at least one document to be printed. The user interface 120 may generate a UI window including a first area to display information of a characteristic of the document, for example, a plurality of types of documents, and a second area to display information on at least one image forming apparatus corresponding to the type of a document or the printing type thereof. The type of a document displayed on the first area and the image forming apparatus displayed on the second area may be changed by user's selection. Also, the user interface 120 may generate a UI window including a third area to display a classified document preservation period and a fourth area to display an image forming apparatus corresponding to the document preservation period. In this case, the user interface 120 may display the type of a document corresponding to the classified document preservation period on a separate window, that is, on a tooltip thereof. The UI window will be described in detail below with reference to FIGS. 2 through 7.

Here, the document may represent an image corresponding to printing data which may be a text document, a picture image, a combination of the text document and the picture image, etc., to be printed as an image on a printing medium. It is possible that the documents may be classified by contents. For example, the documents may be classified into a report, an open document, a contract document, or a daily report. Also, it is possible that the documents may be classified by a preservation period. For example, a report (for approval), an open document or a contract document is classified into an important document so that it can be output through a laser image forming apparatus, whereas a daily report, an absenteeism and tardiness record report, or a weekly report is classified into a relatively less important document so that it can be output at a minimum cost. Also, a report (for approval), an open document, a document, or a contract document may be classified into a document requiring a long-term preservation period over years, for example, five years, whereas a daily report, an absenteeism and tardiness record report, or a weekly report may be classified into a document requiring a short-term preservation period shorter than the years, for example, five years. As such, the document may be classified into diverse ranges such as a short-term period, a mid-term period, and a long-term period according to the preservation period.

Therefore, the document type of the printing data can be determined according to a characteristic of the document or a usage of the document, or selected by the user through the UI window of the interface 120. The printing type of the image forming apparatus may be determined by a characteristic of the image forming apparatus or by a user preference (or selection). The printing type may be suitable to be printed in the image forming apparatus according to a user preference, a characteristic of the document, and/or a characteristic of the image forming apparatus. It is possible that the printing type of the image forming apparatus may be determined by a pattern of the document type of the printing data which have been printed in the corresponding image forming apparatus. The image forming apparatus can be selected to receive the printing data of the document and to print an image of the printing data according to the characteristics of the document and the image forming apparatus, that is, the document type of the printing data and the printing type of the image forming apparatus.

The storage unit 130 may store a lookup table containing information regarding an image forming apparatus corresponding to the type of a document. More specifically, the storage unit 130 may store information regarding an image forming apparatus corresponding to the type of a document or the document preservation period set for the corresponding document in the form of a lookup table. The lookup table may be optimized and provided by image forming apparatus developers and may be changed according to user's selection. The lookup table may be managed as a whole by a server manager, and also may be modified by the server manager. The modified look-up table may be distributed to each print terminal unit 100.

Also, the storage unit 130 may store a history on an executed print job. More specifically, the storage unit 130 may store a history on user's selection about a document which is currently printed by a following series of operations and on an image forming apparatus which performs the printing operation. It is possible that the history can be obtained from one or more printing job to print one or more previous documents or from the one or more image forming apparatuses which have performed a printing operation according to the printing jobs to print the corresponding documents.

The storage unit 130 may be realized as an internal storage medium of the print terminal unit 100 or an external storage medium, for example, a removable disk including a USB memory or a web server through a network. The information stored in the lookup table may include information on each of image forming apparatuses to corresponding to the type or characteristic of the document to be printed. The information stored in the lookup table may be input according to a user selection (input) or a signal received from an external device. The external device may be a medium storing the information and/or a printer driver to control a corresponding image forming apparatus. The external device may be a network or a information provider to provide the information on the image forming apparatus The determination unit 140 determines an image forming apparatus that corresponds to the selected type of a document among the plurality of image forming apparatuses, according to data stored in the lookup table. More specifically, the determination unit 140 searches for an image forming apparatus corresponding to the type of a document which is selected by the user through the user interface 120, using the lookup table pre-stored in the storage unit 130. The determination unit 140 determines the image forming apparatus as an image forming apparatus such that the document is output to the image determined image forming apparatus to print the document on a printing medium using a printing unit therein.

If a plurality of types of documents is selected, the determination unit 140 may select an image forming apparatus corresponding to the type of a document which is pre-set to have the highest priority. More specifically, there may be a plurality of types of documents that can be selected by the user in view of how the document to be printed is classified. Therefore, if the user selects a plurality of types of documents through the user interface 120, the determination unit 140 searches for an image forming apparatus corresponding to the type of a document which is pre-set to have the highest priority and determines the image forming apparatus as an image forming apparatus to output the document instructed to be printed.

Also, the determination unit 140 may select an image forming apparatus that corresponds to a selected document from among the plurality of image forming apparatuses according to at least one of the lookup table and the history. More specifically, if the history regarding the process of printing a current document is stored, the determination unit 140 determines an image forming apparatus to output the current document by referring to the history pre-stored in the storage unit 140. In this case, if the image forming apparatus in the lookup table is different from the image forming apparatus in the history, an image forming apparatus in the history is used to select the image forming apparatus to print the document. The controller 160 may generate a signal to control the user interface to display the record on the history, so that the user selects the type of a document according to the displayed record.

The driver 150 may convert the document into printing data of a format that is readable by the image forming apparatus. The driver 150 may be a combined driver as a single printer driver to control the plurality of image forming apparatus to print the document. Also, the driver 150 may not perform a conversion operation to convert the document into the printing data if the image forming apparatus supports a direct printing function that can print a document without data conversion.

The controller 160 controls the image forming apparatus, which has been determined to correspond to the selected type of a document according to the lookup table, to print the document. More specifically, the controller 160 controls the driver 150 to convert the document into printing data through the printer driver corresponding to the image forming apparatus which has been determined by the determination unit 140, and controls the communication interface 110 to transmit the printing data to the image forming apparatus, such that the image forming apparatus prints the document.

Also, the controller 160 may store the history regarding the executed print job to the storage unit 130. More specifically, because the same selection is repeated for the corresponding document, the controller 160 may store history information such as a target document which has been printed, the type of a document which is selected by the user, and an image forming apparatus which has performed a print job, to the storage unit 130. Such an operation may be performed according to user's selection. It is possible that the operation can be automatically performed without requiring a user's command repeatedly input by the user to store the corresponding history. The controller 160 may be realized as a printer driver including the determination unit 140 and the driver 150 or may be realized as an extra application to install a corresponding printer driver.

Although the print terminal unit 100 of FIG. 1 receives user's selection on the type of a document through the user interface 120, a method capable of automatically determining the type of a document by extracting a file name or a title of a document may be applied so that a print job can be automatically performed through an image forming apparatus corresponding to the type of a document without extra user's selection.

Also, although the type of a document is selected with respect to a single document in FIG. 1, a window through which the user can select the type of each document with respect to a plurality of documents collectively or individually may be provided to the user through the user interface 120 so that the user can select the type of a document with respect to the plurality of documents.

Accordingly, the user can perform a printing operation economically or simply by selecting the type of a document or the preservation period of a document.

Figure 2:
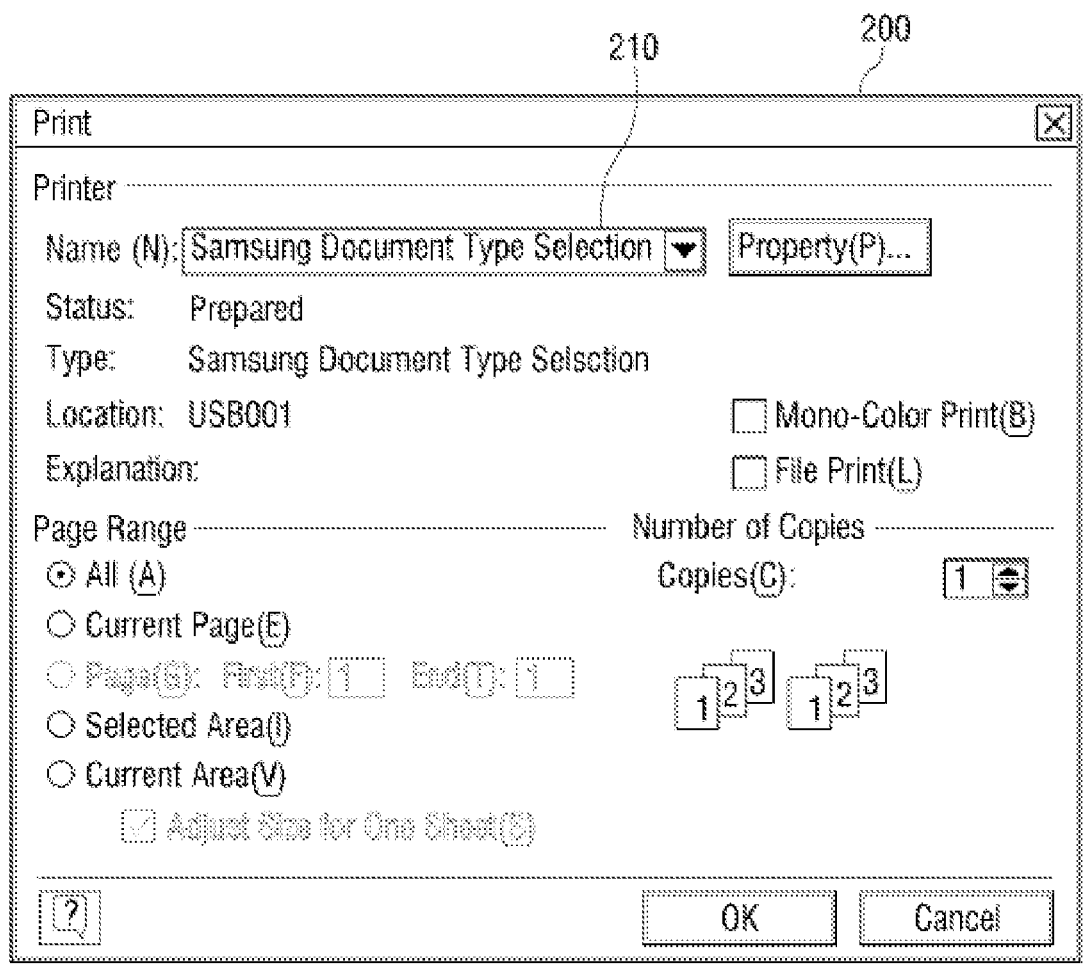

FIG. 2 is a view illustrating an example of a user interface window displayed on the print terminal unit 100.

Referring to FIG. 2, a printer driver titled "Samsung Document Type Selection" 210 is illustrated by way of an example. The printer driver titled "Samsung Document Type Selection" (210) may display a user interface window as illustrated in FIGS. 3 through 7.

Figure 3:
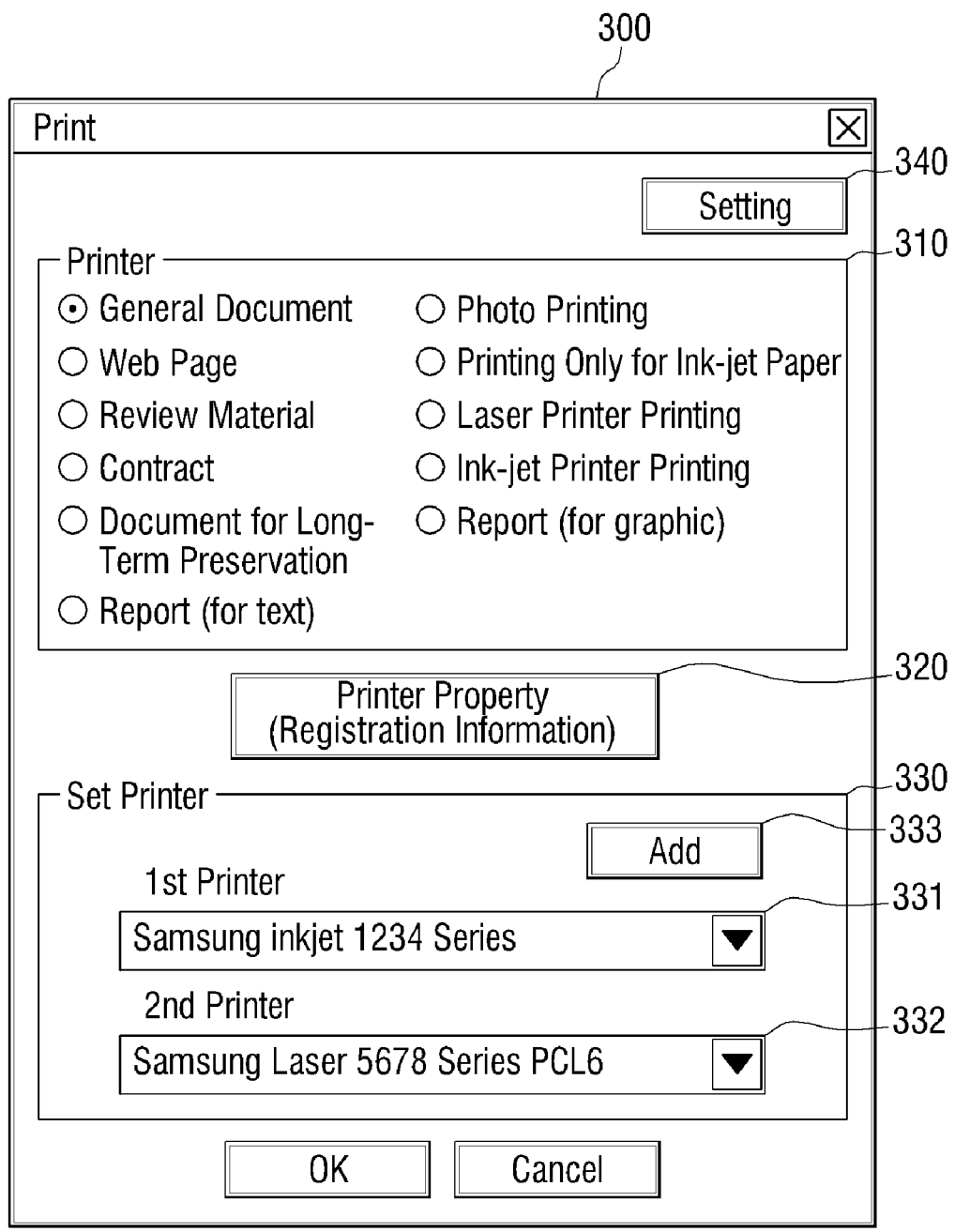

FIG. 3 is a view illustrating an example of a user interface window displayed on the print terminal unit 100.

Referring to FIG. 3, the user interface window includes a first area 310 to display one or more types (characteristics) of documents that can be selected by the user, a second area 330 to display a plurality of image forming apparatuses having information corresponding to the current type of a document, a setting area 340 to change a relationship with an image forming apparatus corresponding to the type of a document, and an area 320 to change the property of a currently set image forming apparatus.

More specifically, the first area 310 displays diverse types of documents which can be selected by the user. For example, a general document, a contract document, a report, and etc. are displayed such that the user selects one of them according to the contents or the preservation period of a current document. Also, the types of documents displayed on the first area 310 may be deleted or added with a new one by user's selection.

It is possible that the types of the document can be displayed in the first area 310 when the types of the documents are automatically determined according to a characteristic of the document. It is also possible that the information on the image forming apparatus can be displayed in the second area 320 when the information is automatically determined according to a characteristic of the corresponding image forming apparatus.

The second area 330 displays image forming apparatuses corresponding to the type of a document. More specifically, the second area 330 displays a first printer 331 in which an ink jet printer is set, and a second printer 332 in which a laser printer is set. The image forming apparatuses displayed on the second area 330 may be changed by user's selection. For example, the user adds a third printer by selecting an adding area 333. That is, although only the two image forming apparatuses are illustrated in FIG. 3, three or more image forming apparatuses may be displayed on the second area 330 according to user's selection.

The first printer 331 may be the inkjet printer using a first printing material, such as ink, to form an image on a printing medium, and the second printer 332 may be the laser printer using a second printing material, such as a developer, to form an image on a printing medium. It is possible that the first printer 331 may be a color inkjet printer and the second printer 332 may be a non color inkjet printer, fore example, a black and white inkjet printer. It is also possible that the first printer 331 may be a color laser printer and the second printer 332 may be a non-color laser printer. That is, the printers of the image forming apparatuses may use different printing materials to perform a printing operation to form an image on a printing medium.

The setting area 340 is used for the user to select a setting menu when the user wishes to change the types of documents displayed on the first area 310 and the image forming apparatuses corresponding to the type of a document. If the user selects the setting area 340, a UI window, for example, the setting menu, is displayed as illustrated in FIG. 4.

Accordingly, the user can perform a printing operation through an image forming apparatus suitable for a corresponding document by selecting the type of a current document from among the types of documents displayed on the first area 310.

Although the UI window including diverse areas 310, 320, 330, 340 are displayed in the illustrated example, only the first area 310 may be displayed for the user.

Figure 4:
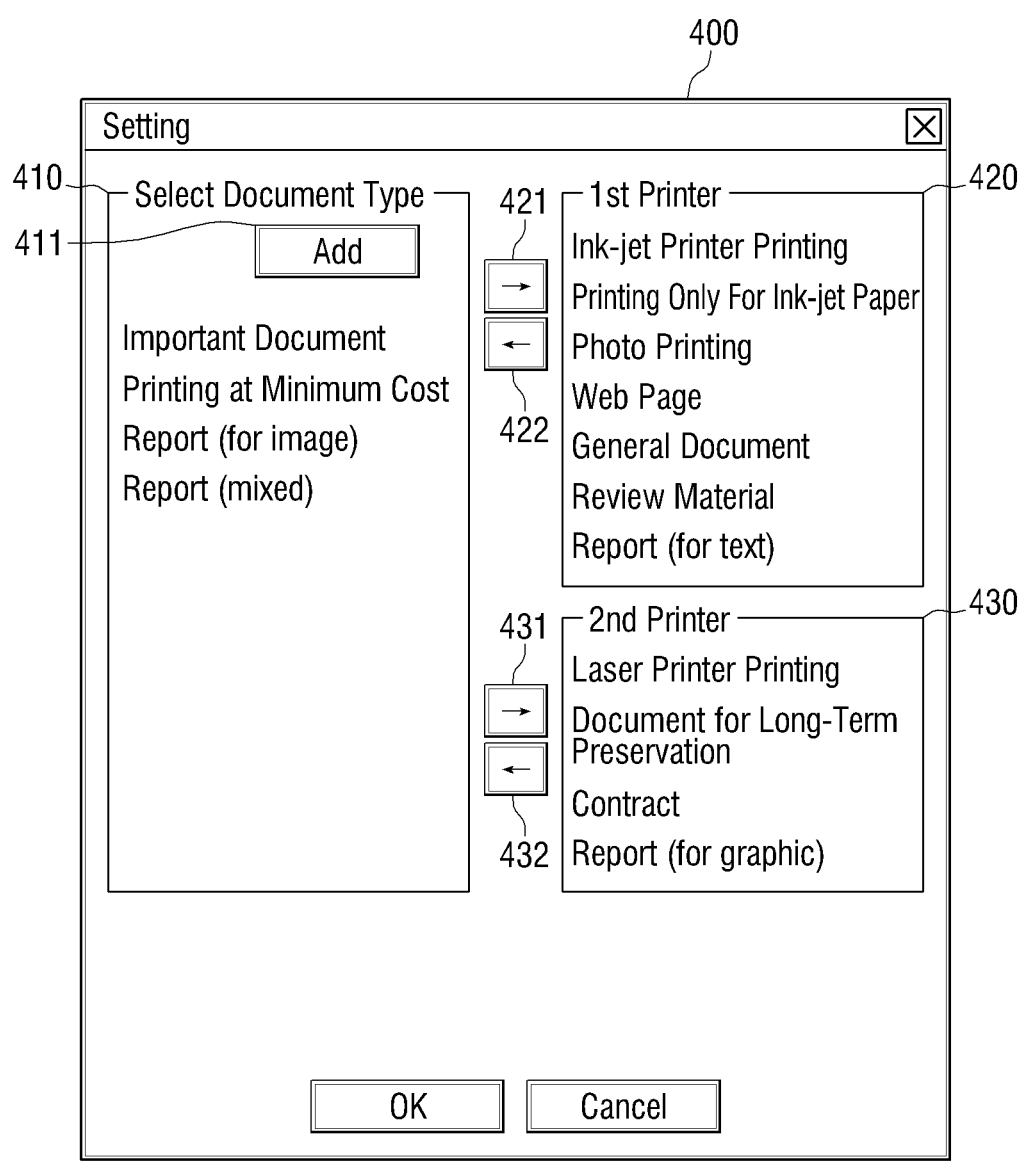

FIG. 4 is a view illustrating an example of a user interface window when the user selects the setting area of FIG. 3.

Referring to FIG. 4, the user interface window includes an area 410 to select the type of a document, an area 420 to display the types of documents corresponding to the first printer, an area 430 to display the types of documents corresponding to the second printer, and areas 421, 422, 431, and 432 to receive a user command to add or delete the type of a document to or from each image forming apparatus.

Accordingly, if there is no type of a document desired by the user in the types of documents displayed on FIG. 3, the user selects an "Add" area 411 to select the desired type of a document, and creates and amends a lookup table regarding image forming apparatuses corresponding to types of documents by adding or selecting an image forming apparatus corresponding to the type of document by selecting the areas 421, 422, 431, and 432.

Figure 5:
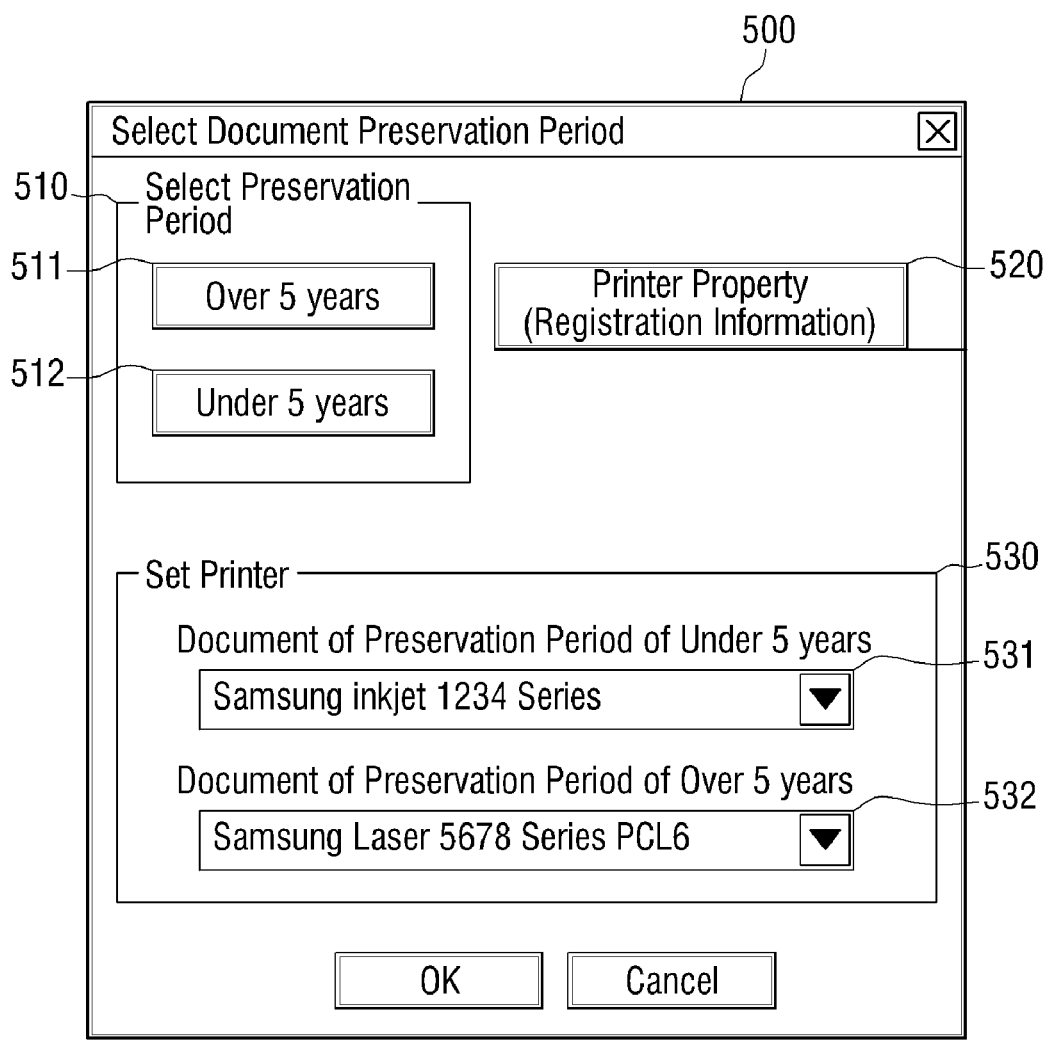

FIG. 5 is a view illustrating an example of a user interface window regarding selection on a document preservation period.

Referring to FIG. 5, the user interface window includes a third area 510 to display characteristics of the documents, for example, classified document preservation periods, and a fourth area 530 to display information on the image forming apparatuses corresponding to the document preservation periods.

More specifically, the third area 510 includes an area 511 "over 5 years" and an area 512 "under 5 years" which are classified by a document preservation period. For example, a report requiring a long-term preservation period, a report (for approval), an open document, or a contract document is classified into a document having a preservation period of over 5 years. If the user places a mouse close to the area 511 "over 5 years", a UI window 600 shown in FIG. 6 is displayed on the UI window 500 of FIG. 5 in the form of a tooltip.

A report (draft), a daily report, an absenteeism and tardiness record report, or a weekly report is classified into a document requiring a preservation period of under 5 years. If the user places the mouse close to the area "under 5 years", a UI window 700 illustrated in FIG. 7 is displayed on the UI window 500 of FIG. 5 in the form of a tooltip. Examples of documents classified by the document preservation period may be displayed on the side of the area 511 "over 5 years" and the area 512 "under 5 years". The document preservation period may be classified more diversely.

Accordingly, the user can perform a printing operation through an image forming apparatus suitable for the document preservation period simply by selecting the preservation period of the document to be output.

Figure 8:
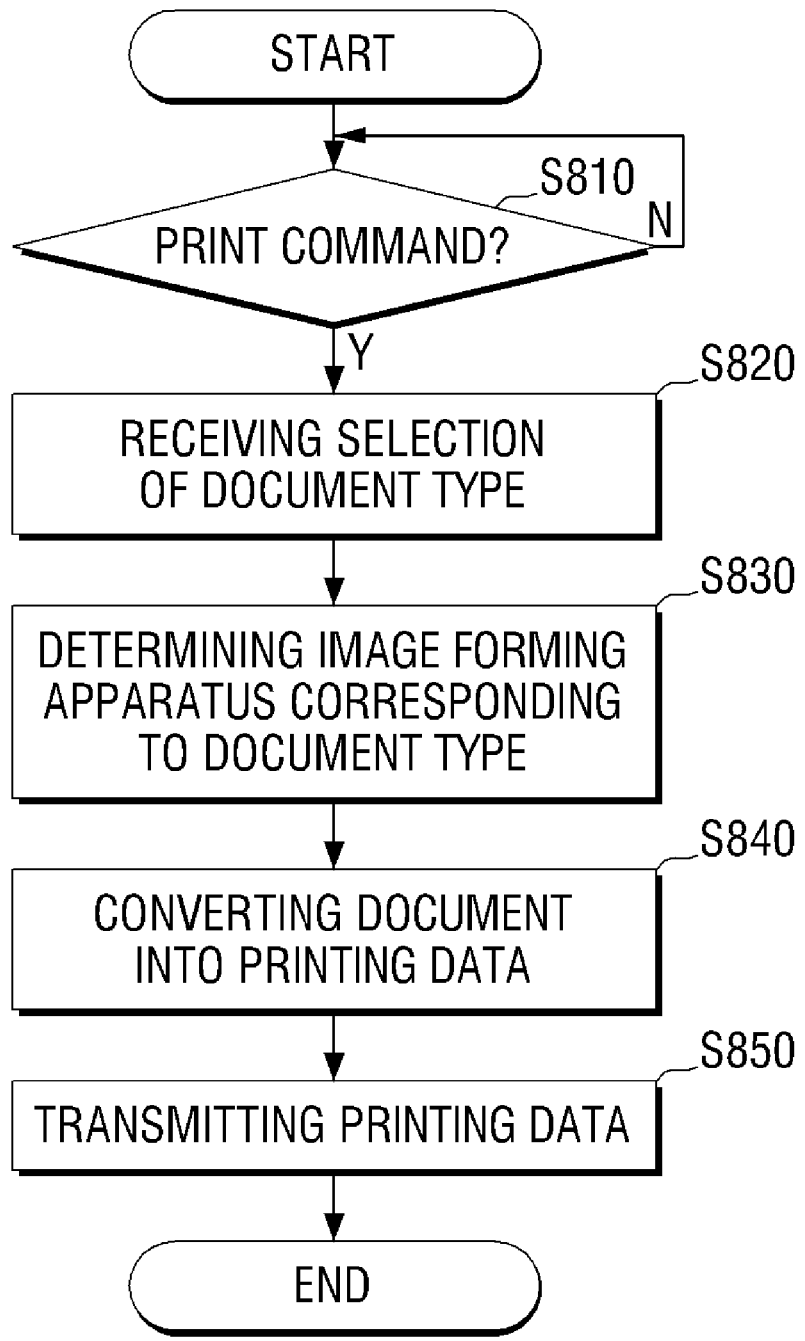
FIG. 8 is a flowchart illustrating a method for controlling print according to an exemplary embodiment of the present general inventive concept.

FIG. 8 is a flowchart illustrating a method of controlling print according to an exemplary embodiment of the present general inventive concept.

Referring to FIG. 8, if a command to print at least one document is received in operation S810, at least one type of the document to be printed is selected in operation S820. More specifically, a UI window including a first area to display plural types of documents and a second area to display image forming apparatuses corresponding to the type of document is generated so that the type of a document is selected. Also, a UI window including a third area to display classified document preservation periods and a fourth area to display image forming apparatuses corresponding to the document preservation period is generated so that the type of a document is selected. In this case, in order to assist the user in selecting the type of a document, the type of a document corresponding to the classified document preservation period may be displayed in the form of a tooltip. The operation of receiving selection on the type of a document to be printed was described above in relation to the interface 120 of FIG. 1 and FIGS. 2 to 7 and thus detailed description is omitted.

An image forming apparatus that corresponds to the selected type of a document is determined among a plurality of image forming apparatuses according to the lookup table on which information regarding the image forming apparatus are recorded for each type of document in operation S830. More specifically, the user searches for an image forming apparatus corresponding to the type of a document selected by the user, using the pre-stored lookup table to determine which image forming apparatus will be used to output a document which is instructed to be printed. In this case, if a history on a previous printing process of a current document is pre-stored, the image forming apparatus may be determined with reference to the history. This was described above in relation to the determination unit 140 of FIG. 1 and thus detailed description is omitted.

A printer driver corresponding to the determined image forming apparatus is controlled to convert the document into printing data in order for the determined image forming apparatus to print the document in operation S840, and transmits the converted printing data to the image forming apparatus in operation S850. As the same selection regarding the corresponding document is repeated, history information such as the document which has been printed, the type of a document which is selected by the user, and the image forming apparatus which has performed the printing operation may be displayed.

Accordingly, the user can obtain information regarding the image forming apparatus corresponding to the type of a document, and can perform a print job using the image forming apparatus corresponding to the type of a document simply by selecting a single button displayed on the UI. The method for controlling print illustrated in FIG. 8 may be executed through the print terminal unit 100 having the configuration of FIG. 1 and also may be executed through a print terminal unit having other configuration.

Figure 9:
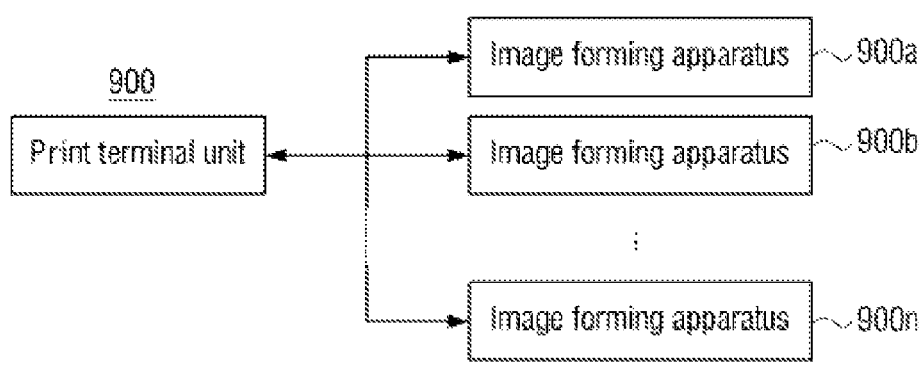
FIG. 9 is a view illustrating a printing system having a print terminal unit and a plurality of image forming apparatuses according to exemplary embodiment of the present general inventive concept.

FIG. 9 is a view illustrating a printing system having a print terminal unit 900 and a plurality of image forming apparatuses 900a through 900n according to exemplary embodiment of the present general inventive concept. Each of the image forming apparatus 900a through 900n may have a characteristic corresponding to a printing type suitable to the corresponding image forming apparatus 900a through 900n. The image forming apparatus may have a printing unit to print an image on a printing medium according to printing data received from the print terminal unit 900. The print terminal unit 100 of FIG. 1 may be used as the print terminal unit 900 of FIG. 9. The print terminal unit 900 may store information on the characteristics corresponding to the respective printing types suitable to the corresponding image forming apparatuses 900a through 900n The print terminal unit 900 may compare the printing type and a document type of the printing data to be printed as the image to generate a selection signal to select one or the image forming apparatuses 900a through 900n according to the comparison such that the selected image forming apparatus prints the image on the print medium according to the printing data.

Figure 10:
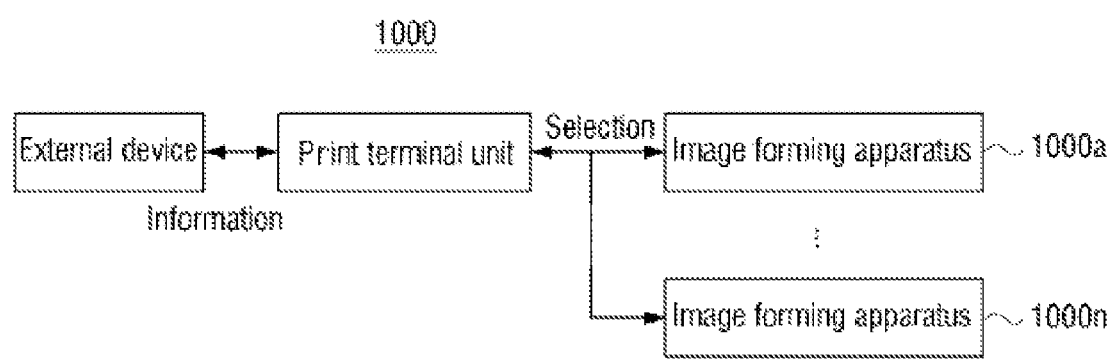
FIG. 10 is a block diagram illustrating a printing system having a print terminal unit connectable to a plurality of image forming apparatuses according to exemplary embodiment of the present general inventive concept.

FIG. 10 is a block diagram illustrating a printing system having a print terminal unit 1000 connectable to a plurality of image forming apparatuses 1000a through 1000n according to exemplary embodiment of the present general inventive concept. The print terminal unit 1000 may be connected to an external device (or a service provider). The external device may provide information on the printing type printable in the corresponding image forming apparatus to the print terminal unit 1000 through a wired or wireless communication line. It is possible that when the print terminal unit 1000 receives a printer driver of the corresponding image forming apparatus from the external device and installs the received printer driver therein, the print terminal unit 1000 may receive the information on the printing type of the corresponding image forming apparatuses and store the received information in the storage unit 130 (FIG. 1). Accordingly, the print terminal unit 1000 selects the image forming apparatus, outputs a selection signal to the selected image forming apparatus, and also transmits the printing data to the selected image forming apparatus.

It is possible that the external device may be installed inside a housing of the print terminal unit 1000 as a disk driver to obtain the printer driver and the information of the image forming apparatus from a disk loaded in the disk driver. It is also possible that the external device may be a terminal to be connectable to a memory storing the printer driver and/or the information. Accordingly, the printer driver and/or the information of the image forming apparatus can be obtained from the external device such that the printer terminal device can select the image forming apparatus according to the information and the document type of the printing data to be printed as an image on a printing medium.

Figure 11:
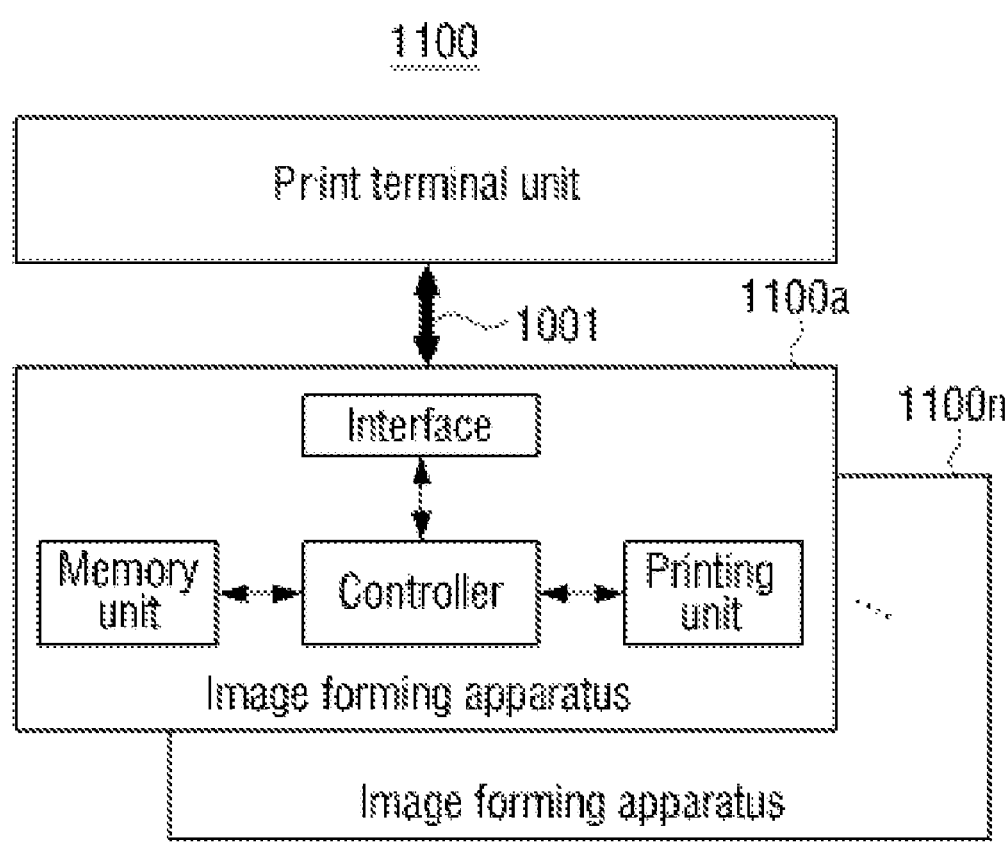
FIG. 11 is a block diagram illustrating a printing system having an image forming apparatus connectable to a print terminal unit according to exemplary embodiment of the present general inventive concept.

FIG. 11 is a block diagram illustrating a printing system having an image forming apparatus 1100a through 1100n connectable to a print terminal unit 1100 according to exemplary embodiment of the present general inventive concept. The image forming apparatus 1100a may include an interface to communicate with the print terminal unit 1100 through a wired or wireless communication line 1001, a memory unit to store information on a printing type of the image forming apparatus 1100a, a printing unit to feed a printing medium and print an image on the fed printing medium according to printing data, and a controller to control the respective units and to control the memory unit to transmit the information to the print terminal unit 1000. The print terminal unit 1100 receives the information from the image forming apparatus 1100a and determines or selects the image forming apparatus 1100a to print the image of the print data when a document type of the print data corresponds to the information of the printing type. And then the print terminal unit 1100 outputs the printing data to the image forming apparatus which has transmitted the information corresponding to the document type of the printing data or image to be printed.

Figure 12:
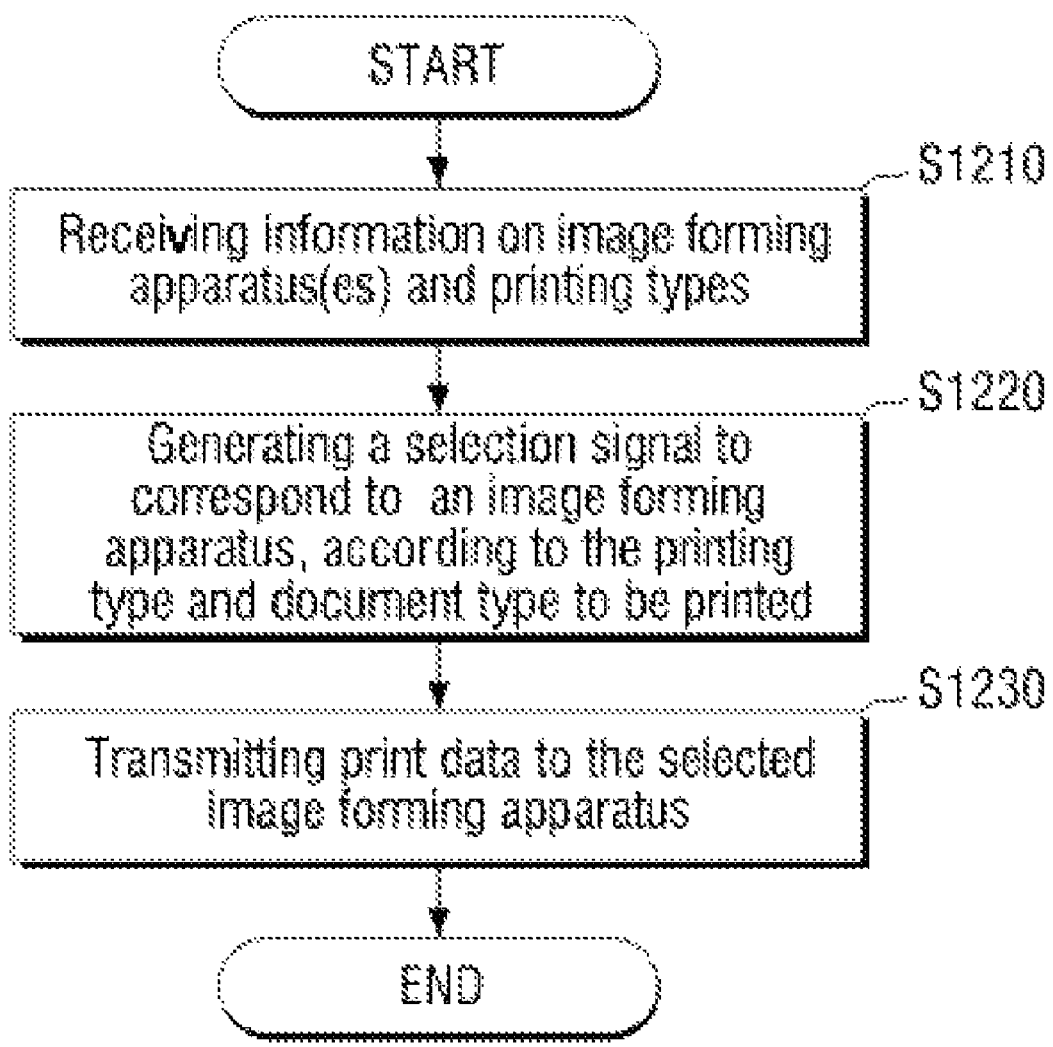
FIG. 12 is a flowchart illustrating a method of a print terminal unit according to exemplary embodiment of the present general inventive concept.

FIG. 12 is a flowchart illustrating a method of a print terminal unit according to exemplary embodiment of the present general inventive concept. Referring to FIGS. 9 through 11, a print terminal unit receives information on an image forming apparatus and a printing type of the image forming apparatus in operation S1210. It is possible that the print terminal unit receives information on different image forming apparatuses and different printing type corresponding to the respective different image forming apparatuses. The print terminal unit generates a selection signal to correspond to an image forming apparatus according to the printing type and a document type of printing data to be printed as an image on a printing medium in operation S1220. The print terminal unit transmits the printing data to the selected image forming apparatus in operation S1230.

Figure 13:
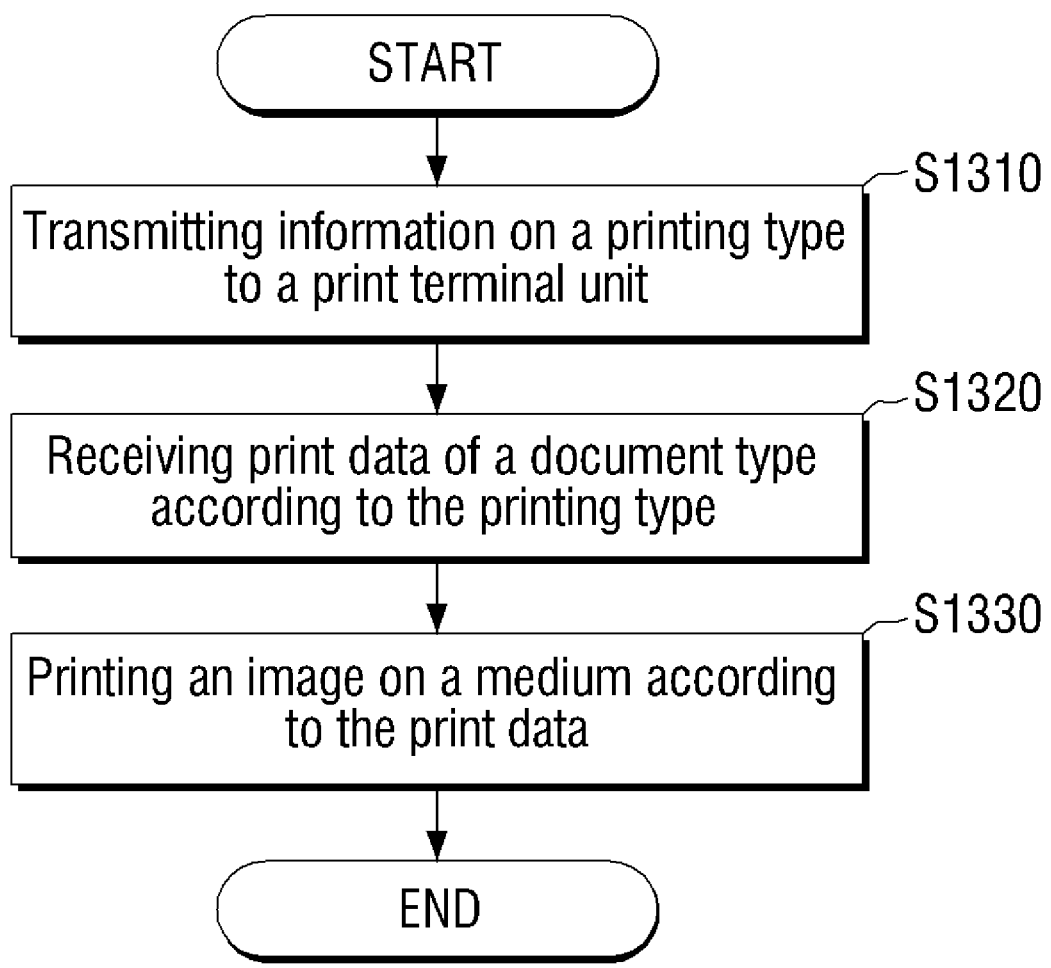
FIG. 13 is a flowchart illustrating a method of an image forming apparatus according to exemplary embodiment of the present general inventive concept.

FIG. 13 is a flowchart illustrating a method of an image forming apparatus according to exemplary embodiment of the present general inventive concept. Referring to FIGS. 9 through 12, an image forming apparatus transmits information on a printing type suitable or desirable to print an image in the image forming apparatus to a print terminal unit which can generates printing data to be printed, in operation S1310. The image forming apparatus receives the printing data having a document type corresponding to the printing type from the print terminal unit in operation S1320. The image forming apparatus prints an image on a printing medium according to the received printing data in operation S1330.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A print terminal unit which is connectable to a plurality of image forming apparatuses, the print terminal unit comprising:

a storage unit to store a lookup table on which information regarding an image forming apparatus corresponding to at least one type of a document is recorded;

a user interface through which at least one type of at least one document to be printed is selected; and a controller to control an image forming apparatus that corresponds to the selected type of the document among the plurality of image forming apparatuses according to the lookup table to print the document, the type of the document being associated with a content of the document.

2. The print terminal unit of claim 1, wherein the user interface generates a UI window including a first area to display the at least one type of the document and a second area to display an image forming apparatus corresponding to the type of the document.

3. The print terminal unit of claim 2, wherein the type of the document displayed on the first area and the image forming apparatus displayed on the second area are changeable.

4. The print terminal unit of claim 1, wherein the type of the document is classified by a document preservation period.

5. The print terminal unit of claim 4, wherein the user interface generates a UI window including a third area to display a classified document preservation period and a fourth area to display an image forming apparatus corresponding to the document preservation period.

6. The print terminal unit of claim 5, wherein the user interface displays a type of a document corresponding to the classified document preservation period on a separate window.

7. The print terminal unit of claim 1, wherein the storage unit further stores a history for a print job executed for the document, and the controller determines one of the plurality of image forming apparatuses according to at least one of the lookup table and the history.

8. The print terminal unit of claim 1, wherein the controller determines another image forming apparatus to print the document when there is no match between the information of the image forming apparatus and the type of the document.

9. A method of controlling print of a print terminal unit which is connectable to a plurality of image forming apparatuses, the method comprising:

receiving selection of at least one type of at least one document to be printed;

determining an image forming apparatus that corresponds to the selected at least one type of the document among the plurality of image forming apparatuses, using information regarding an image forming apparatus corresponding to a type of a document, the at least one type of the document being associated with a content of the at least one document; and printing the document through the determined image forming apparatus.

10. The method of claim 9, wherein the receiving the selection of the type of the document comprises generating a UI window including a first area to display the at least one type of the document and a second area to display an image forming apparatus corresponding to the type of the document.

11. The method of claim 10, wherein the type of the document displayed on the first area and the image forming apparatus displayed on the second area are changeable.

12. The method of claim 9, wherein the type of the document is classified by a document preservation period.

13. The method of claim 12, wherein the receiving the selection of the type of the document comprises generating a UI window including a third area to display a classified document preservation period and a fourth area to display an image forming apparatus corresponding to the document preservation period.

14. The method of claim 13, wherein the receiving the selection of the type of the document comprises displaying the type of the document corresponding to the classified document preservation period on a separate window.

15. The method of claim 9, further comprising:

storing a history for a print job executed for the document;

wherein the determining comprises determining one of the plurality of image forming apparatuses according to at least one of the lookup table and the history.

16. The method as claimed in claim 9, wherein the receiving the selection is performed by a printer driver or an application.

17. The method as claimed in claim 9, wherein the determining the image forming apparatus comprises determining another image forming apparatus to print the document when there is no match between the information of the image forming apparatus and the type of the document.

18. A print terminal unit, comprising:

a storage unit to store information regarding one or more document types associated with at least one of a plurality of image forming apparatuses;

a determination unit to determine, among the image forming apparatuses, an image forming apparatus associated with the document type of a document based on the information, the document type of the document being associated with a content of the document; and a controller to control the determined image forming apparatus to print the document.

19. The print terminal unit of claim 18, wherein the information is customizable to customize the association between the plurality of printers and the one or more document types.

20. The print terminal unit of claim 18, wherein:

the document is characterized by a plurality of document types, the document types having different priorities, and the determination unit determines the image forming apparatus associated with the document type of the document that has a highest priority among the plurality of document types of the document.

\* \* \* \* \*